(12) United States Patent
Morita et al.

(10) Patent No.: US 6,409,918 B1
(45) Date of Patent: *Jun. 25, 2002

(54) APPARATUS FOR SUPPLYING OZONATED ULTRAPURE WATER

(75) Inventors: Hiroshi Morita, Hadano; Tetsuo Mizuniwa, Yokosuka; Junichi Ida, Koga, all of (JP)

(73) Assignee: Kurita Water Industries Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,836

(22) Filed: Nov. 4, 1998

(30) Foreign Application Priority Data

Nov. 6, 1997 (JP) ................................. 9-304617

(51) Int. Cl.⁷ .................................................. C02F 1/78
(52) U.S. Cl. ...................... 210/192; 210/188; 210/194; 210/198.1; 210/900
(58) Field of Search ................................. 210/900, 188, 210/198.1, 192, 760, 194; 422/186.07, 186.08, 186.14, 31; 134/902; 95/241; 96/155

(56) References Cited

U.S. PATENT DOCUMENTS

| | | | |
|---|---|---|---|
| 5,447,640 A | 9/1995 | Omi et al. | 210/748 |
| 5,554,295 A | 9/1996 | Ban et al. | 210/668 |
| 5,645,727 A | 7/1997 | Bhave et al. | 210/651 |

FOREIGN PATENT DOCUMENTS

| | | | |
|---|---|---|---|
| EP | 433893 A2 | | 6/1991 |
| EP | 585461 A1 | | 3/1994 |
| JP | 05-096277 | * | 4/1993 |
| JP | 07-14817 | * | 1/1995 |
| JP | 07-024484 | * | 1/1995 |
| JP | 08-316187 | * | 11/1996 |

* cited by examiner

*Primary Examiner*—Joseph W. Drodge
*Assistant Examiner*—Terry K. Cecil
(74) *Attorney, Agent, or Firm*—Morrison Law Firm

(57) ABSTRACT

An ozonated ultrapure water supply system that prevents reduction of the dissolved ozone concentration in the supply pipe system and maintains the dissolved ozone at points of use along the supply system at desired concentrations. This permits the system to supply ozonated water in long pipes. The system includes a sequential arrangement of a circulatory main pipe 3 for supplying ultrapure water, an ozonated gas supplying device 4, and at least two output branch lines 8 each having a gas/liquid separation device 9 and an ultimate point of use 7. The output branch lines are spaced downstream from the ozonated gas supplying device such that the ozone concentration in the ultrapure water has increased to a stable level and the ozonated ultrapure water at each output branch line is at this same stable ozone concentration.

5 Claims, 4 Drawing Sheets

APPARATUS FOR SUPPLYING OZONATED ULTRAPURE WATER

BACKGROUND OF THE INVENTION

The present invention relates to a novel system for providing a relatively constant concentration of ozonated ultrapure water to remote points of use. The present invention may be used in applications requiring a supply of ozonated ultrapure water such as for use in cleaning semiconductor substrates.

In the prior art, silicon substrates for semiconductors and glass substrates for liquid crystals are cleaned using what is called RCA cleaning. RCA cleaning is a high temperature cleaning method that uses concentrated hydrogen peroxide-based chemicals. Examples of these chemicals include a water solution of hydrogen chloride and aqueous hydrogen peroxide, or a water solution of aqueous ammonia and aqueous hydrogen peroxide. This method is expensive due to the costs of purchasing chemicals, obtaining purified water for rinsing and for waste disposal. In addition, air pollution devices are required to decontaminate exhaust and steam produced from the process. This method is also costly in terms of its impact on the environment. The method uses a great deal of water, discharges liquid chemical waste and releases waste gases. In recent years, in order to reduce these drawbacks, wet cleaning processes have been reassessed.

For example, Japanese Laid-Open Patent Number 7-14817 discloses a cleaning method and device for washing silicon wafers. The method reduces chemical concentrations, shortens cleaning times, reduces the number of chemicals, makes recovery of wastes easier and reduces investment in equipment. The method involves placing the object to be washed horizontally inside a cleaning tank. A chemical cleaning step provides a continuous chemical flow from above. The object to be cleaned is rotated under the flow. A purified water cleaning step supplies purified water. The chemical cleaning step and the purified water cleaning step are performed sequentially in the same cleaning tank. Ozonated ultrapure water is proposed as the first chemical solution.

Furthermore, in Japanese Laid-Open Patent Number 8-316187, the present inventors have proposed a method for the efficient removal of metal pollutants and organic pollutants from the top of a semiconductor substrate. The method does not use chemicals such as highly concentrated hydrochloric acid or hydrogen peroxide. Rather, a cleaning method is proposed wherein the cleaning step adds ozone to an acidic aqueous solution containing chloride compounds. This makes processing the waste solution generated by the cleaning process easier.

Ozone dissolved in ultrapure water has a very strong oxidizing effect even at concentrations of only a few ppm. It is highly effective in removing organic substances and metals. It would be desirable to generate a source of ultrapure water containing a high concentration of dissolved ozone. However, the solubility of ozone in water is relatively small. In addition, autolysis of ozone into oxygen also occurs. These limitations prevent the preparation of a high concentration of dissolved ozone in water that can then be diluted to an appropriate concentration.

The realities of the cleaning process are such that the demand for ozonated ultrapure water is not always constant. It is difficult to supply ozonated purified water at a constant concentration that is independent of demand. Because of this problem, the prior art method continually supplies ozonated ultrapure water at a constant flow and constant concentration, even when the demand is low.

The present inventors have previously developed a closed loop system, wherein the makeup water of ultrapure water and the excess ozonated ultrapure water are collected in a tank. Ozone is dissolved in this water to compensate both for the effect of dilution by the makeup water and for the effect of autolysis. Ozone dissolved in ultrapure water is liable to autolyse even at normal temperatures. In this system, if the loop length is too long, the amount of supplemental ozone required to compensate for dilution and autolysis becomes large. In addition, a dissolved ozone concentration gradient develops between the upstream and downstream portions of the pipes. This uneven concentration of dissolved ozone is not desirable. Therefore, when long piping is used, this system is not adequate.

In the water supply system for ozonated ultrapure water previously developed by the present inventors, the ozone dissolving area and the ozonated purified water supply piping system are set up separately. In other words, upon increasing the dissolved ozone concentration to a specified concentration, gas/liquid separation is first conducted in the ozone dissolving area so that no undissolved ozone gas remains in the ultrapure water supply pipe. Alternatively, ozone is dissolved while the gas and liquid are separated using a gas permeable membrane. Ozonated ultrapurified water is then sent to the supply system. This method is adequate if the ozone dissolving area is placed near the point of use. This method is also adequate if ozonated ultrapurified water is transported from the ozone dissolving area to the point of use via a short piping system. However, when using a long piping system, the dissolved ozone concentration is constantly being reduced through autolysis. Thus, it is not possible, using this system, to have points of use remotely located from the ozone dissolving device.

OBJECTS AND SUMMARY OF THE INVENTION

In light of the above, it is an object of the present invention to overcome the limitations of the prior art.

The present inventors have discovered through intensive study, that using the ultrapure water supply pipe as the ozone dissolving area, allows for the dissolved ozone concentration to be maintained at a fairly constant concentration. The fairly constant concentration can be maintained even as autolysis occurs. The present invention was developed based on this finding.

It is an object of the present invention to provide an apparatus for supplying ozonated ultrapure water which can suppress the reduction of dissolved ozone concentration within a supply piping system and which can maintain a relatively constant ozone concentration within the supply system. This apparatus may be applied to ultrapure water supply/circulating systems having any length of piping.

It is another object of the present invention to provide an apparatus for supplying ozonated ultrapure water, including, in sequence, a main ultrapure water supply pipe for supplying ultrapure water, an ozonated gas supply device, a branch pipe off of the main ultrapure water supply pipe and a gas/liquid separation device just before the ultimate point of use.

It is another object of the present invention to provide ozonated ultrapure water to a plurality of points of use while only using a single ozonated gas supply device.

It is another object of the present invention to provide an economical way to provide a source of ozonated ultrapure water to a series of points of use having only a single ozone supply device.

It is another object of the present invention to provide a closed loop system for providing ozonated ultrapure water that conserves unused ozonated ultrapure water.

Briefly stated, the present invention provides an ozonated ultrapure water supply apparatus that prevents reduction of the dissolved ozone concentration in the supply pipe system and maintains the dissolved ozone at points of use along the supply system at desired concentrations. This permits the system to supply ozonated water on long pipes. An apparatus for supplying ozonated ultrapure water includes a sequential arrangement of a main ultrapure water supply pipe for supplying ultrapure water, an ozonated gas supplying device, a branch pipe feeding into a gas/liquid separation device and an ultimate point of use. The flow distance along the main pipe from the ozonated gas supplying device to the branch pipe is selected to achieve a desired level of ozonation.

According to an embodiment of the invention, there is provided an apparatus for supplying ozonated ultrapure water, comprising: a main ultrapure water supply pipe conveying ultrapure water in a loop originating from and returning to a storage device, an ozonated gas supply device, at least one ozone branch pipe from the ozonated gas supply device to the main ultrapure water supply pipe, at least one gas/liquid separation device connected to the main ultrapure water supply pipe a predetermined distance downstream of the at least one ozone branch pipe, the predetermined distance being sufficient to permit a predetermined amount of absorption of ozone in the ultrapure water, an output of the gas/liquid separation device leading ozonated ultrapure water to a point of use, and the gas/liquid separation device including means for separating a substantial amount of undissolved ozone gas from the ultrapure water.

According to a feature of the invention, there is provided an apparatus for supplying ozonated ultrapure water comprising: means for providing ultra pure water, storage means for storing ultra pure water connected to the means for providing ultrapure water, a main conduit for conveying ultrapure water connected to the storage means in a closed loop, transport means for moving the ozonated ultrapure water connected to the conduit and located downstream of the storage means, ozonated gas supply means connected to the conduit, a branch conduit for conveying ultrapure water from the main conduit towards a point of use, a separation means in the branch conduit for removing undissolved ozone gas from the ultrapure water, the branch conduit being connected to the main conduit a predetermined distance downstream from the ozonated gas supply means, and the predetermined distance being effective to provide a predetermined concentration of ozone in the ultrapure water.

According to a preferred embodiment, the present invention includes an apparatus for supplying ozonated ultrapure water including, in sequence, a main pipe for supplying ultrapure water, an ozonated gas supply device, a branch pipe off of the main pipe containing a gas/liquid separation device followed by the ultimate point of use. The ozonated gas supply device delivers ozonated gas to the ultrapure water supply via an ozonated gas supply pipe. The apparatus further includes an in-line mixing mechanism placed downstream from the ozonated gas supply device.

According to another embodiment, the present invention provides an apparatus for supplying ozonated ultrapure water including, in sequence, a main pipe for supplying ultrapure water, an ozonated gas supply device, a branch pipe off of the main pipe and a gas/liquid separation device just upstream of the ultimate point of use. The ozonated gas is supplied to the main ultrapure water supply pipe by gas pressure, suctioning by an ejector, or suctioning on the intake side of a pump.

According to another embodiment, the present invention provides an apparatus for supplying ozonated ultrapure water, including, in sequence, a main pipe for supplying ultrapure water, an ozonated gas supply device, a branch pipe off of the main pipe and a gas/liquid separation device followed by the ultimate point of use. The main pipe for supplying ultrapure water forms a loop originating at an ultrapure water tank and terminating at a different point on the water tank.

According to another embodiment, the present invention is an apparatus for supplying ozonated ultrapure water including, in sequence, a main pipe for supplying ultrapure water, an ozonated gas supply device, a branch pipe off of the main pipe and a gas/liquid separation device followed by the ultimate point of use. An ozone gas supply pipe, leading from the ozone containing gas supply device, provides ozonated gas to multiple locations along the main ultrapure water supply pipe via branched pipe leading from the ozonated gas supply pipe.

The above, and other objects, features and advantages of the present invention will become apparent from the following description read in conjunction with the accompanying drawings, in which like reference numerals and letters designate the same elements.

DETAILED DESCRIPTION OF THE PREFERRED EMBODIMENTS

The ozonated ultrapure water supply apparatus consists of a main pipe for supplying ultrapure water and an ozonated gas supply device connected to the main ultrapure water supply pipe. A branch pipe or pipes lead from the main pipe. The branch pipe or pipes connect to the ultimate point or points of use. Each branch pipe is equipped with a gas/liquid separation device placed prior to the ultimate point of use.

Figure 1:
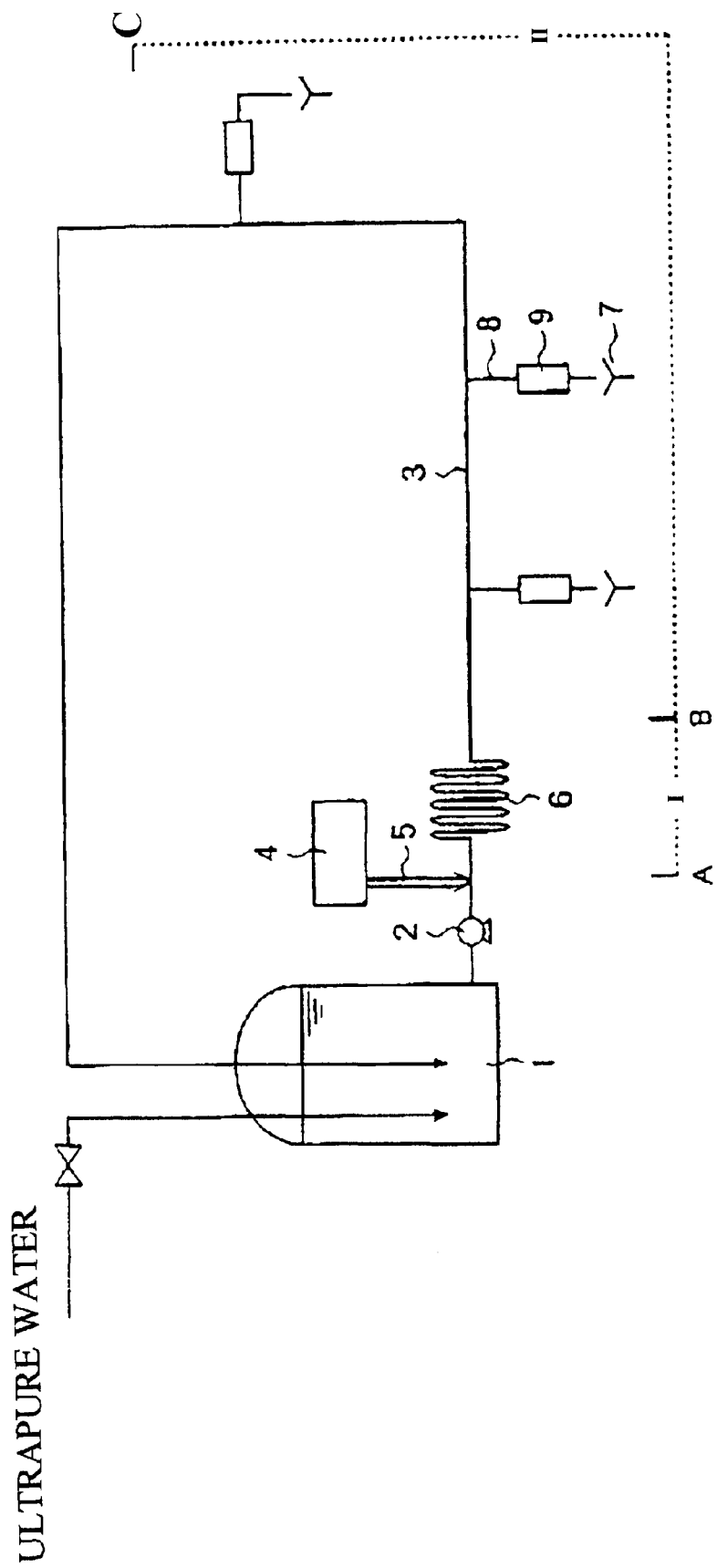
FIG. 1 shows an embodiment of an ozonated ultrapure water supply apparatus according to an embodiment of the present invention.

Referring to FIG. 1, makeup ultrapure water is transported from an ultrapure water producing device (not shown) to collection in an ultrapure water tank 1. Ultrapure water is transferred out of ultrapure water tank 1 to a main ultrapure water supply pipe 3 by a pump 2. In this embodiment, the ultrapure water supply source can be the ultrapure water tank. Alternatively, a subsystem for providing ultrapure water can be used as the source of ultrapure water.

An apparatus for supplying ozone-containing gas 4 is connected through a gas supply pipe 5 to the main ultrapure water supply pipe 3. There are no particular limitations to the ozone containing gas supply device. For example, ozone generators which produce ozone through the electrolysis of water, or through silent discharge in air or oxygen can be used. Methods for supplying ozonated gas to the main ultrapure supply pipe can include gas pressure, suction provided by an ejector and suction provided by a pump.

When the distance between the ozonated gas supply point and the point of use is comparatively long, the supplied ozone dissolves in the ultrapure water as the water flows through the main pipe. However, if the distance between the ozonated gas supply point and the point of use is comparatively short, an inline mixing mechanism is preferred in order to efficiently accelerate the dissolution of ozone. An inline mixing mechanism 6 can be set up as needed downstream from the ozonated gas supply point on the ultrapure water supply main pipe. There are no particular limitations to the inline mixing mechanism. For example, static mixers or line mixers can be used. Alternatively, packing material can be placed in the main pipe to accelerate the gas/liquid contact or the pipe can be bent or coiled, as shown, to lengthen the retention time.

The main ultrapure water supply pipe 3 extends to one or more points of use 7 to supply ozonated ultrapure water to these points. In the present embodiment, the ultrapure water supply main pipe 3 is formed in a loop. The ultrapure water that is not used at the points of use 7 is returned to the ultrapure water tank 1. Alternatively, the end of the ultrapure water supply main pipe 3 may be connected to the ultrapure water producing device via a residual ozone removal device (not shown). The ultrapure water which is not used at the points of use, is thus returned to the ultrapure water producing device, after any residual ozone is removed.

In addition to dissolved ozone, the ozonated ultrapure water also contains undissolved ozone in a carrier gas. This undissolved gas on its way to points of use 7 passes through a branch pipe 8 which branches off from the ultrapure water supply pipe 3. Undissolved gas is not desirable for precise and uniform cleaning. This undissolved gas is removed from the ultrapure. water by a gas/liquid separation device 9 in the branch pipe 8. There are no particular limitations for the gas/liquid separation device 9 as long as it can separate the undissolved gas component from the ultrapure water flow. After this, the ultrapure water is supplied to the point(s) of use 7.

Figure 2B:
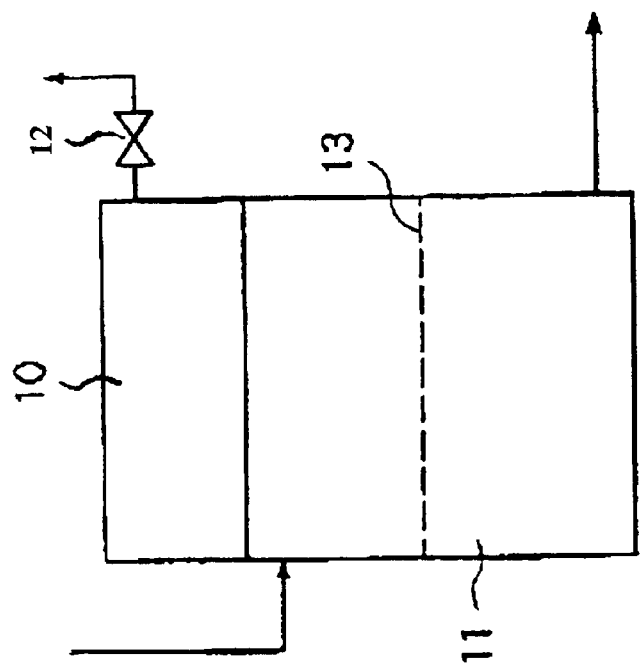
FIG. 2(b) is a schematic diagram showing a second embodiment of a gas/liquid separation device of the present invention.
Figure 2A:
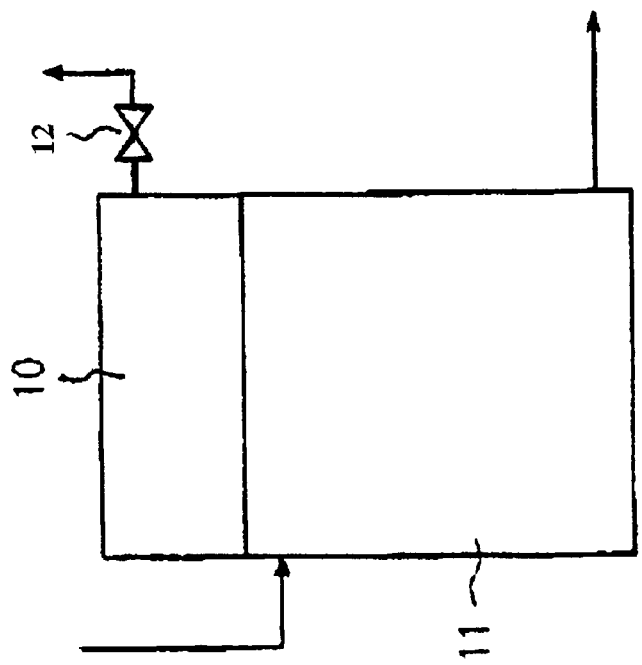
FIG. 2(a) is a schematic diagram showing one embodiment of a gas/liquid separation device of the present invention.

Referring now to FIG. 2(a), one embodiment of the gas/liquid separation device 9 has a gas phase area 10 on top, and a water phase area 11 on the bottom. The velocity of the ozonated ultrapure water is reduced when it enters the larger cross section of the gas/liquid separation device 9. The undissolved ozone gas is released in bubbles that rise to the surface of the water and enter the gas phase area 10. The ozonated ultrapure water, with the undissolved ozone removed, is supplied to the point of use 7 from the bottom water phase area 11 of the gas/liquid separation device 9. The undissolved gas in the gas phase area 10 is released via a valve 12. In FIG. 2(b), the gas/liquid separation device 9 of FIG. 2(a) is equipped with a multiporous plate 13 in the water phase area 11 of the device. This further reduces the flow velocity of the water. Using a multiporous plate 13 or fillers in the water phase area 11, improves separation of the undissolved gas from the water stream.

Figure 3:
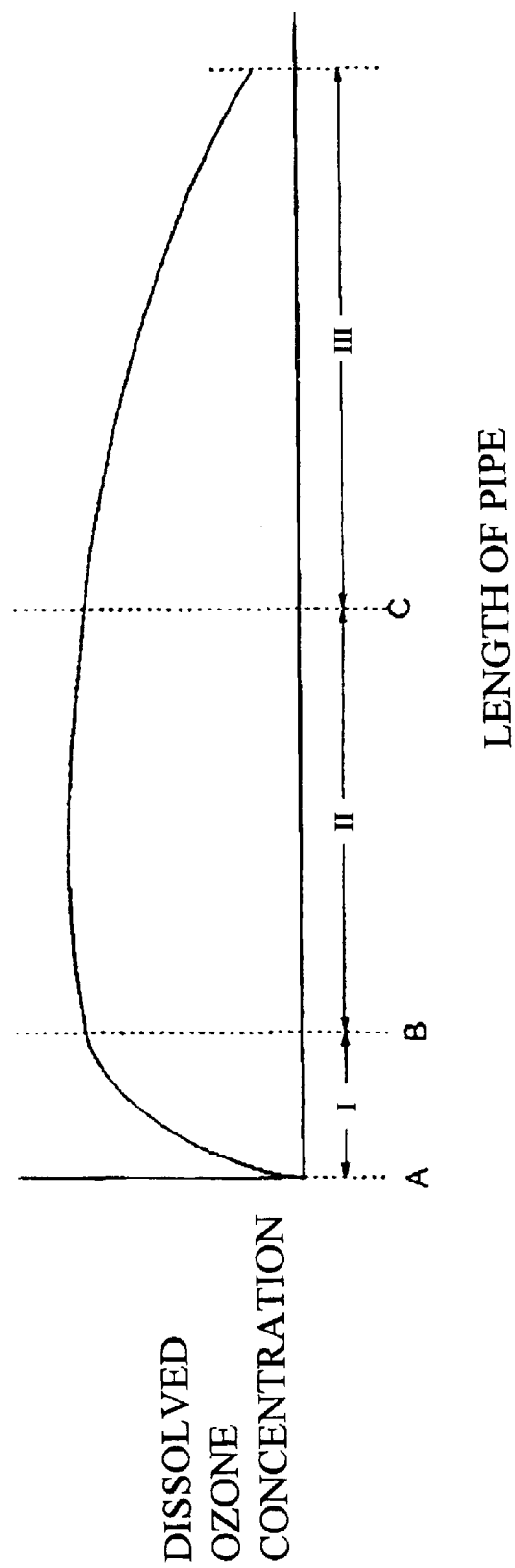
FIG. 3 is a curve showing the relationship between pipe length and dissolved oxygen concentration in the ozonated ultrapure water supply apparatus of the present invention.

Referring now to FIG. 3, a concentration gradient chart for the ozonated ultrapure water supply apparatus of the present invention is represented with the horizontal axis representing the length of the piping. The vertical axis represents the dissolved ozone concentration. When ozonated gas is supplied to ultrapure water at ozonated gas supply point "A" of the main pipe (see also FIG. 1), the ozone dissolves in the ultrapure water and the dissolved ozone concentration increases rapidly. However, as the concentration of ozone dissolved in the ultrapure water increases, the loss of ozone through autolysis becomes prominent. This effect is offset by the fact that gaseous ozone is more stable than ozone dissolved in water. The undissolved ozone gas available in the ultrapure water then dissolves in the ultrapure water. As a result, at point "B," there is an equilibrium where the loss of ozone in the ultrapure water due to autolysis is balanced by the amount of ozone gas dissolving into the ultrapure water. The concentration of dissolved ozone in the ultrapure water is thus maintained at an approximately constant concentration, When the ozonated ultrapure water flows further downstream along the main pipe, the amount of undissolved ozone available in the accompanying gas is reduced. At point "C," it becomes difficult to maintain the equilibrium between the amount of ozone lost due to autolysis and the amount of ozone available to be dissolved in the ultrapure water. At this point, the concentration of dissolved ozone decreases.

Zone I is defined as the zone between points "A" and "B." Zone II is defined as the zone between points "B" and "C." Zone III is defined as the zone downstream of point "C." The device of the present invention uses the ultrapure water in zone II, where the dissolved ozone concentration remains relatively constant. In other words, the branch pipes 8 connected to the points of use 7 are placed in the portion of the main ultrapure water supply pipe 3 corresponding to zone II. The ozonated ultrapure water treated with a gas containing undissolved ozone is supplied to one or more points of use 7 via branch pipes 8. The undissolved ozone is separated from the water stream by gas/liquid separation devices 9. In this way, ultrapure water containing a relatively constant concentration of dissolved ozone is supplied. Thus, the device of the present invention uses the main ultrapure water supply pipe 3 as the ozone dissolving area. Even if the piping system is long, a supply of ozonated ultrapure water having a relatively constant concentration of dissolved ozone is provided.

Thus, in the apparatus of the present invention, the area of zone II is used as the ozonated ultrapure water supply pipe system. In zone II, there is a portion after point "B" where the dissolved ozone concentration rises slowly, and after passing the maximum ozone concentration value, the dissolved ozone concentration decreases slowly. In light of this, it is possible to specify zone II at the manufacturing site, based on the allowable lower limit and upper limit of the dissolved ozone concentration for the particular application. For example, if some amount of variation in concentration is permitted, as in a dissolved ozone concentration of 2 ppm or greater, branch pipes 8 can all be simply connected in zone II.

On the other hand, if the dissolved ozone concentration must be strictly maintained, ozone in excess of the specified ozone concentration is dissolved in the ultrapure water flowing in the main ultrapure water supply pipe 3. Each branch pipe 8 is equipped with a mechanism for monitoring ozone concentration and a control mechanism for regulating ozone concentration (not shown). The ozone concentration is adjusted at this point, by adding ultrapure water which does not contain ozone, so that the specified ozone concentration is supplied.

Figure 4:
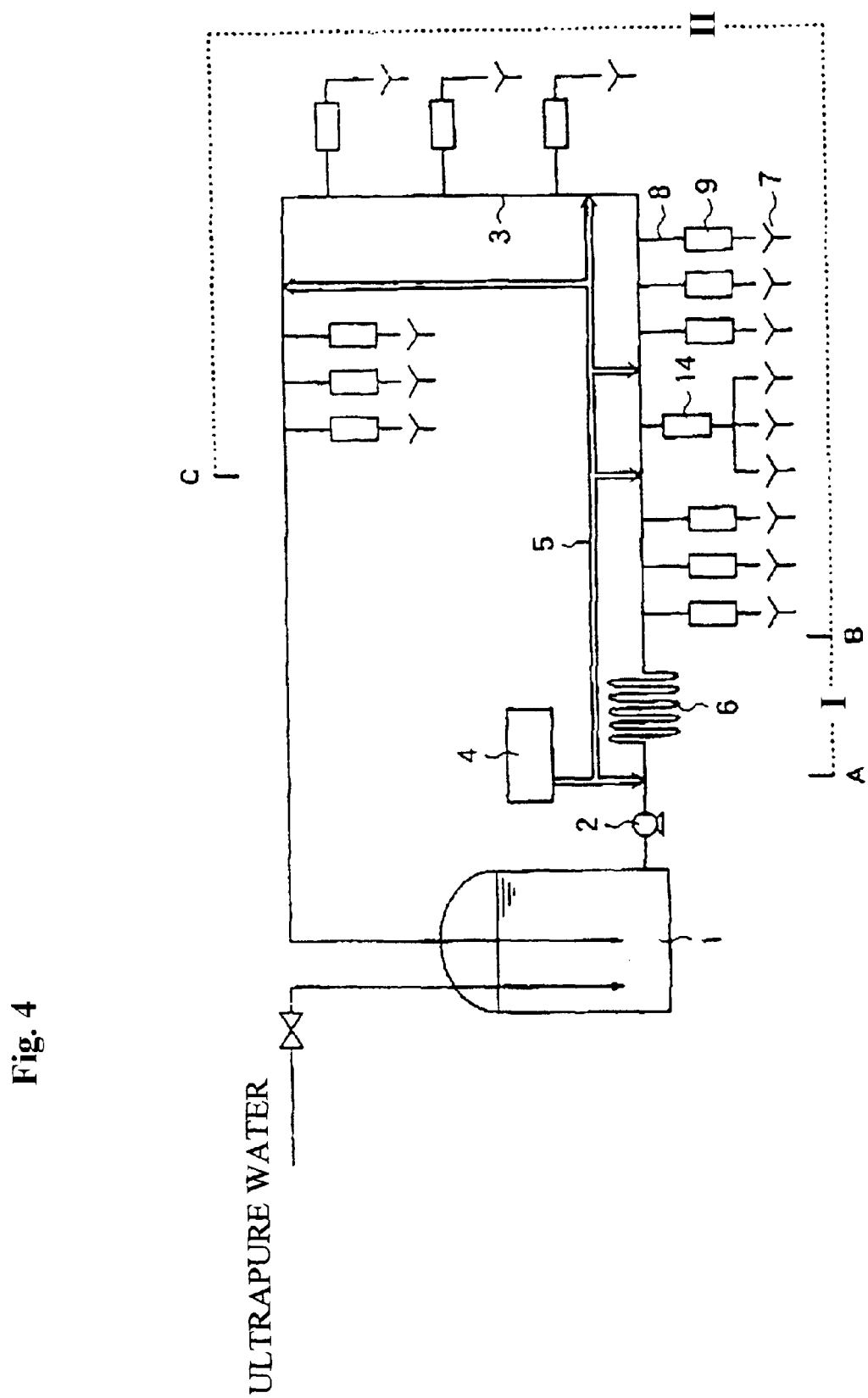
FIG. 4 shows an embodiment of an ozonated ultrapure water supply apparatus of the present invention.

Referring now to FIG. 4, another embodiment of an ozonated ultrapure water supply apparatus of the present invention includes branches in the ozonated gas supply pipe 5. The illustrated embodiment includes five ozone containing gas supply pipes 5 connected to spaced-apart points on the main ultrapure water supply pipe 3. In this design, new ozonated gas is supplied to the ultrapure water flow before the amount of ozone gas available for dissolving in the ultrapure water becomes less than the amount of autolysed ozone. In this way, the concentration of dissolved ozone gas is maintained at the zone II level all along the length of the main ultrapure water supply pipe 3. Thus, zone II, where the dissolved ozone concentration in the ultrapure water is approximately constant, is lengthened. It becomes possible to supply ozonated ultrapure water to multiple points of use. Because gaseous ozone is more stable compared to ozone dissolved in water, it is easier to provide ozonated gas at a specified concentration from a series of ozonated gas supply points to the main ultrapure water supply pipe 3. This system obviates the need for a plurality of ozonated gas supply devices. By using this method of supplying ozonated gas along the way, the limitation on the length of the main ultrapure water supply pipe 3 is eliminated. In addition, a gas/liquid separation device 9 can be placed on the individual branch pipe leading to every point of use 7. Alternatively, a manifold gas/liquid separation device 14 can be shared by a number of points of use 7. Thus, branch pipes 8 can be placed after the gas/liquid separation device 14 to supply ozonated ultrapure water to a plurality of points of use 7 from a single gas/liquid separation device 14. According to the ozonated ultrapure water supply apparatus of the present invention, dissolved ozone is maintained at a relatively constant concentration. The length of the main ultrapure water supply pipe 3 is no longer a limiting factor, as it was in the prior art. In addition, ozonated ultrapure water can be supplied to numerous points of use 7. Furthermore, by using a method of supplying ozonated gas to numerous supply points on the main pipe, there is no limitation on the length of the main ultrapure water supply pipe 3. As a result, use of ozonated ultrapure water for wet cleaning processes becomes more economical.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for supplying ozonated ultrapure water comprising:
    a main ultrapure water supply line;
    means for circulating ultrapure water in said main ultrapure water supply line;
    an ozonated gas supply device;
    an ozone branch pipe from said ozonated gas supply device to said main ultrapure water supply line;
    a first output branch line of said main ultrapure water supply line located a first predetermined distance downstream of said ozone branch pipe;
    said first predetermined distance being sufficient to permit an ozone concentration dissolved in said ultrapure water at said first output branch line to have reached a substantially stable level;
    a second output branch line of said main ultrapure water supply line located a second predetermined distance downstream of said first output branch line; and
    said second predetermined distance being small enough that an ozone concentration dissolved in said ultrapure water at said second output branch line remains at said substantially stable level.

2. An apparatus according to claim 1, further comprising a gas/liquid separation device in at least said first output branch line.

3. An apparatus according to claim 2, further comprising a respective gas/liquid separation device in each of said first and second output branch lines.

4. An apparatus according to claim 1, further comprising:
    a second ozone branch pipe from said ozonated gas supply device to said main ultrapure water supply line;
    said second ozone branch pipe being connected to said main ultrapure water supply line a third predetermined distance downstream of said second output branch line;
    said third predetermined distance being sufficient that an ozone concentration in said ultrapure water has decreased from said substantially stable level, whereby said ozone concentration is replenished at said second ozone branch pipe;
    a third output branch line of said ultrapure water supply line a fourth predetermined distance downstream of said second ozone branch pipe; and
    said fourth predetermined distance is sufficiently downstream of said second ozone branch pipe to permit an ozone concentration in said ultrapure water supply line to again increase to said substantially stable level at said third output branch line.

5. An apparatus according to claim 1, wherein at least one of said first and second output branch lines feeds a manifold which, in turn, feeds ozonated ultrapure water to at least two using devices.

* * * * *